United States Patent [19]

Krooss et al.

[11] Patent Number: 4,457,421

[45] Date of Patent: Jul. 3, 1984

[54] BOTTLE ORIENTATION APPARATUS

[76] Inventors: Robert J. Krooss, 74 Ball Rd., Mountain Lakes, N.J. 07046; David D. Demarest, 58 Maple Ave., Pine Brook, N.J. 07058

[21] Appl. No.: 257,155

[22] Filed: Apr. 24, 1981

[51] Int. Cl.³ .............................................. B65G 47/14
[52] U.S. Cl. ..................................... 198/396; 198/415
[58] Field of Search ............... 198/396, 399, 400, 415, 198/453, 569, 954

[56] References Cited

U.S. PATENT DOCUMENTS

| | | | |
|---|---|---|---|
| 3,100,562 | 8/1963 | Whelan | 198/400 |
| 3,339,702 | 9/1967 | Novak et al. | 198/453 |
| 3,624,773 | 11/1971 | Krooss | 198/397 |

Primary Examiner—Joseph E. Valenza
Assistant Examiner—Jonathan D. Holmes
Attorney, Agent, or Firm—Stephen E. Feldman

[57] ABSTRACT

The present invention discloses an apparatus for stand-up orientation of bottles, which apparatus has a minimum of moving parts, and includes an assembly of side gripping belts substantially parallel to a stand-up chute. The belts are driven at speeds commensurate with the bottles speed while coming from an alignment chute under the influence of gravity. In order to accomplish the stand-up orientation of the bottles, the assembly of belts is adjustable relative to the stand-up chute. The apparatus further consists of means to deliver bottles to the alignment chute and means to remove bottles which have been stood up.

4 Claims, 10 Drawing Figures

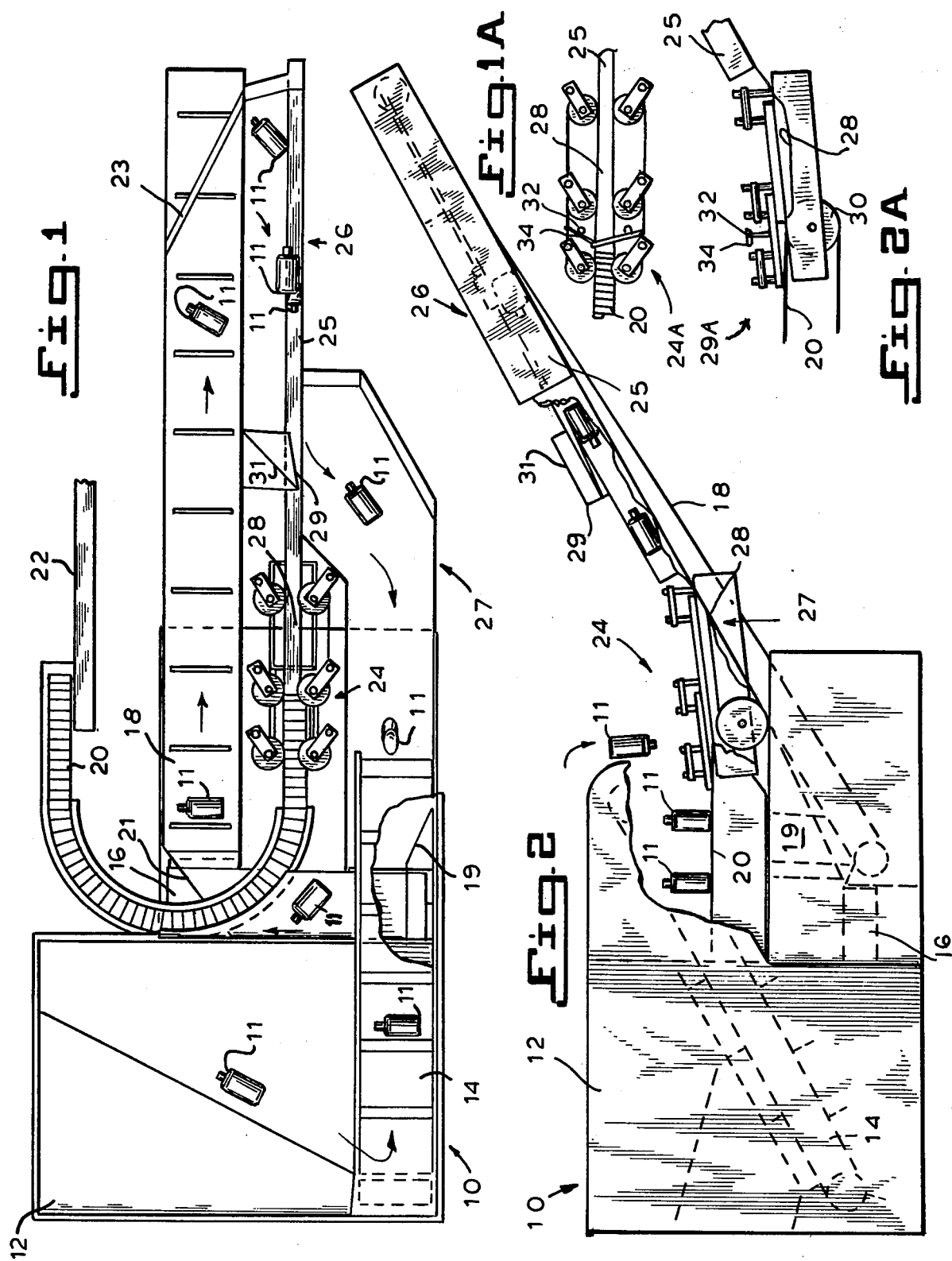

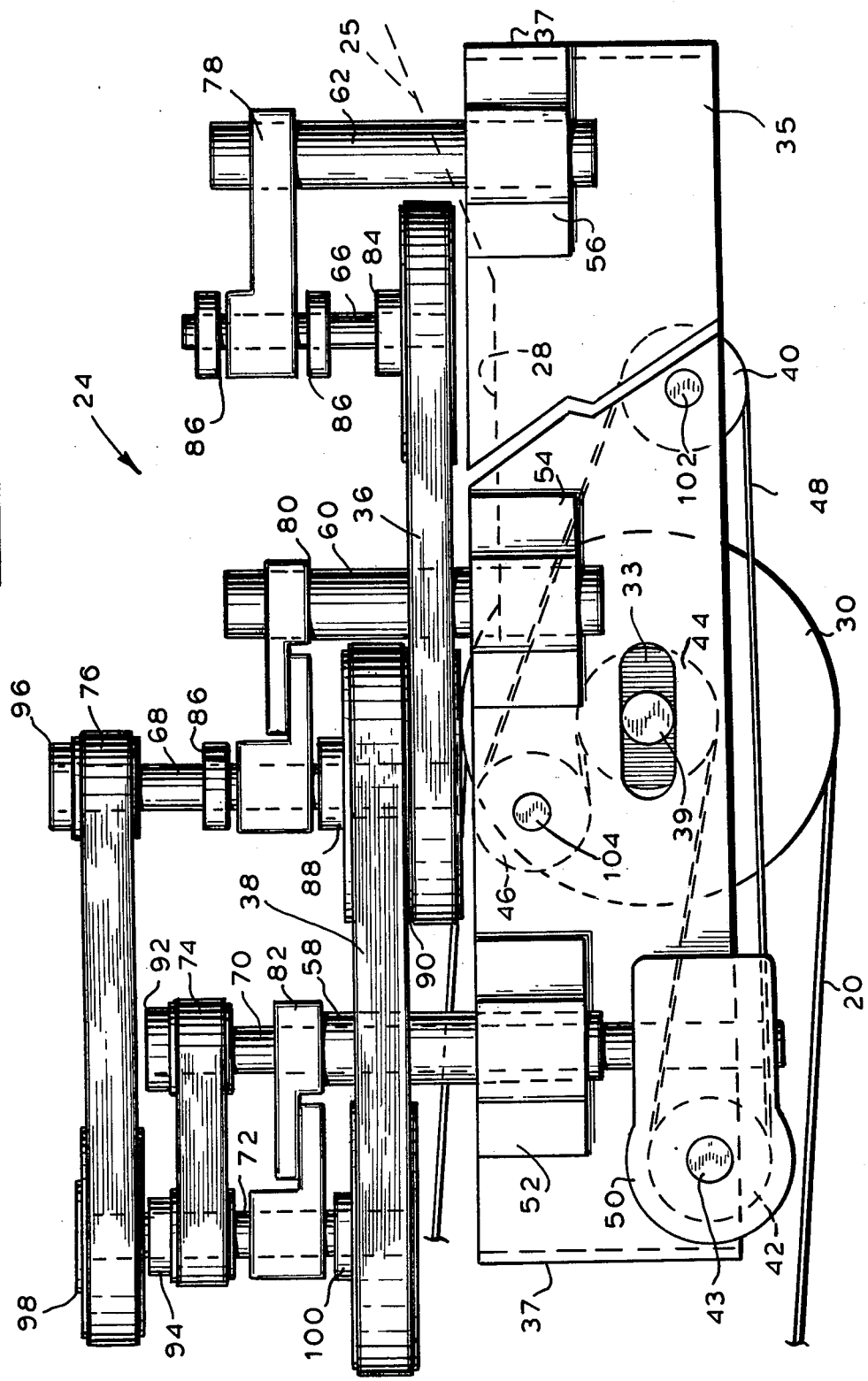

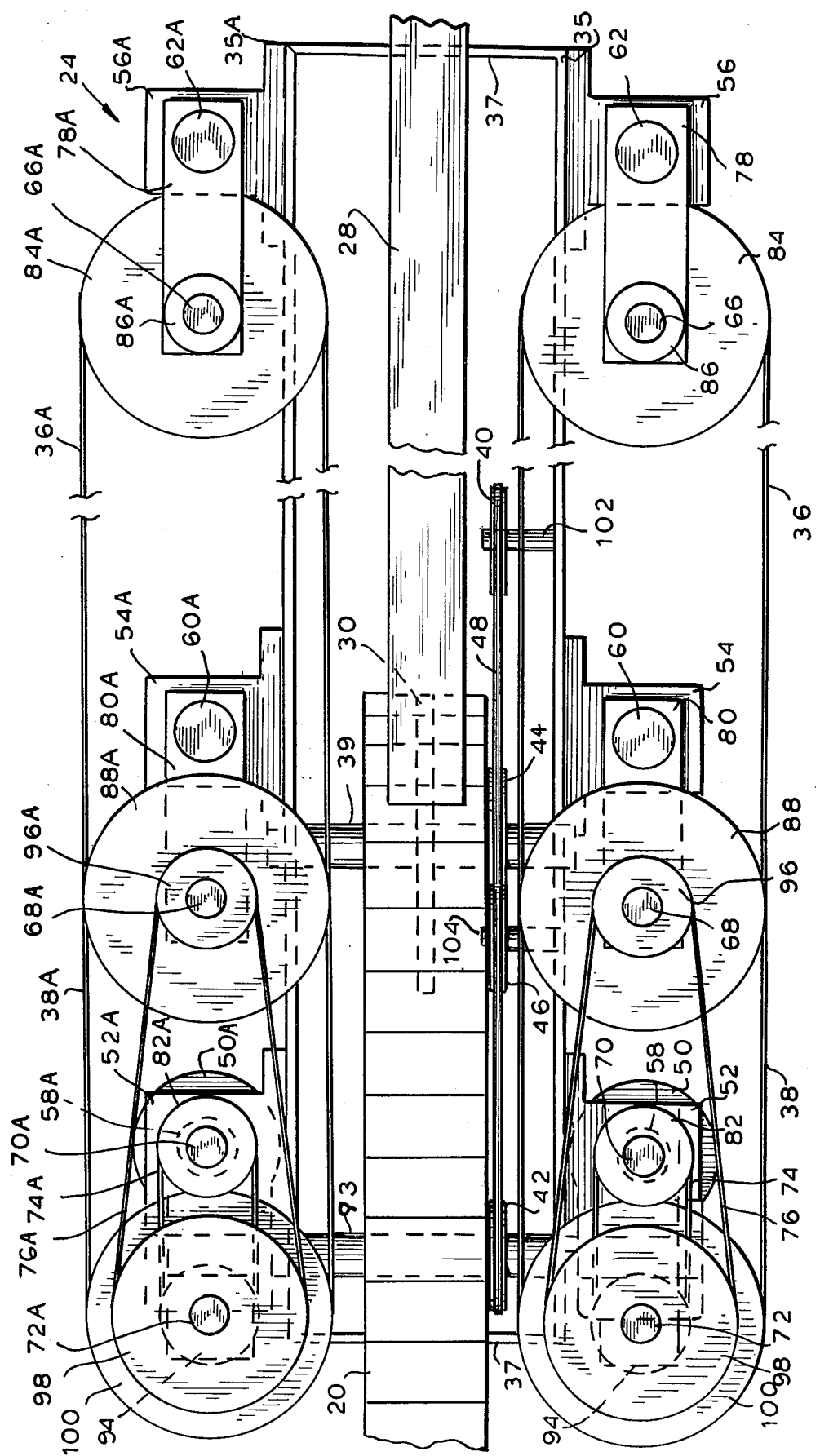

BOTTLE ORIENTATION APPARATUS

FIELD OF THE INVENTION

This invention relates generally to bottle conveying apparatus. Specifically, this invention relates to an apparatus for orientation of bottles and their placement in a base down configuration on a conveyor belt.

BACKGROUND OF THE INVENTION AND DISCUSSION OF PRIOR ART

While the invention is subject to a wide range of applications, it is especially suited for orientation of bottles preparatory to further processing of the bottles.

Prior art machines are available for orientation of bottles and other items.

U.S. Pat. No. 2,159,049 to Quamma, discloses a can aligning means which comprises a gate for preventing stacked cans for impinging on the segregating bars. The gate simply applies a retarding force to be stacked can permitting the bottom can to proceed in its original direction.

U.S. Pat. No. 3,598,223, to Lauer, discloses a pear halve orienting means which comprises a chute for longitudinally aligning the pears and turning them face down.

U.S. Pat. No. 3,624,773 to Krooss employs conveyor belts to hold the bottles and convey them past orienting fixtures in order to stand the bottles base down.

U.S. Pat. No. 3,726,387 to Krooss describes an apparatus which employs a pin to reorient neck leading bottles to a base leading condition.

U.S. Pat. 3,690,437, to Kammann, discloses an apparatus for aligning and arranging bottles in an upright position. Here is shown the use of a chute for longitudinal alignment of the bottles and the reversal of neck leading bottles by a catch member as the bottle drops onto a conveyor belt.

U.S. Pat. No. 3,868,012, to Kinsley, discloses an apparatus which employs a chute to longitudinally align bottles and then has a pneumatically operated projection which flips the bottle.

U.S. Pat. No. 4,148,390, to Ionesco, discloses a chute for longitudinally aligning bottles and side gripping disks in conjunction with a lever to invert bottles if required, so they sit on a conveyor belt base down. A pair of side gripping belts ensure that the bottles are well seated on the conveyor belt.

U.S. Pat. No. 4,208,761, to Ionesco, discloses a chute for longitudinal alignment of bottles and radial side gripping discs in conjunction with a levered hook to invert bottles. The inverting process ensures that all bottles placed upside down on the belt conveyor are based against the conveyor.

While the above discussed inventions are also directed to alignment stand-up, the present invention provides a more direct and more economic manufacture and, because of its simpler design and fewer parts, is less subject to malfunction and therefore, requires a minimum of maintenance.

Accordingly, it is an object of the present invention to provide an improved bottle stand-up orientation apparatus having fewer moving mechanical elements.

It is a further object of the present invention to provide an apparatus as aforesaid which provides a reliable positive acting bottle stand-up orientation.

Accordingly, there has been provided an apparatus to convey and stand-up orient bottles, for the packaging industry, which apparatus has fewer moving parts than prior art machines and yet is positive acting with high reliability.

BRIEF DESCRIPTION OF THE DRAWINGS

FIG. 1, is a top plan view of the bottle orienting apparatus of the present invention;

FIG. 1A, shows an alternate arrangement for the stand up mechanism;

FIG. 2, shows a side plan view of the bottle orienting apparatus of the present invention;

FIG. 2A, shows the first alternate arrangement for the stand up mechanism;

FIG. 3, shows a side view of the stand up mechanism; and

FIG. 4, shows a top plan view of the stand up mechanism;

SUMMARY OF THE INVENTION

Figure 5:
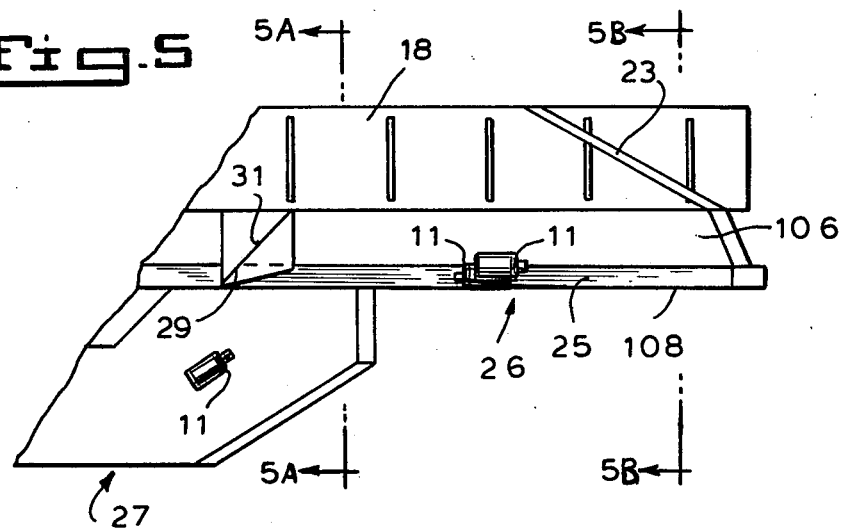
FIG. 5, shows a top view of the alignment chute.

The apparatus of the present invention provides positive acting stand-up orientation to bottles by imparting differential speed frictional engagement to the sides of the bottle while moving downwardly under the influence of gravity. Differential speed engagement is imparted to the bottles by entrance and exit belts in parallel, overlapping disposition, with the entrance belts moving faster than the exit belts, carrying an uprighting action to the bottle.

For a better understanding of the present invention, together with other and further objects therefor, reference is made to the following description taken in conjunction with accompanying drawings while its scope will be pointed out in the appended claims.

DESCRIPTION OF THE PREFERRED EMBODIMENTS

A bottle conveying apparatus 10 comprises in general terms, a hopper 12 feeding bottles to a first conveyor 14. First conveyor 14 drops the bottles into a return chute 27 from which the bottles slide onto a second conveyor 16. Second conveyor 16 transfers bottle 11 onto the bottom part of third conveyor 18 which lifts bottle 11. Third conveyor 18 then transfers bottle 11 to an alignment chute 26. Bottles 11 which are not aligned by chute 26 are deflected by a plow 29 onto the return chute 27 for recycling. Bottles 11 which are aligned by chute 26 enter a stand up belt unit 24 and are placed base down on fourth conveyor 20.

Specifically, reference to FIG. 1 and FIG. 2 generally shows a bottle conveying apparatus 10. Bottle conveying apparatus 10 has a hopper 12 for storing and feeding of a bottle 11 to the bottom portion of a first conveyor 14. The arrow at the bottom portion of first conveyor 14 illustrates the general flow of bottles 11. Bottle 11 then is carried by first conveyor 14 and dropped onto a side chute 27. Again, this is illustrated by an arrow at the top portion of first conveyor 14.

Bottle 11 slides down inclined side chute 27 and is deflected by a first baffle 19 onto a second conveyor 16.

Second conveyor 16 (moving in the direction of the arrow shown) causes bottle 11 to hit and be deflected by a second baffle 21. Second baffle 21 causes bottle 11 to engage a third conveyor 18 which moves in the direction of the arrows shown. Third conveyor 18 lifts bottle 11 from the location of second conveyor 16 to the top of an alignment chute 26. Alignment chute 26 has a third baffle 23 which redirects bottle 11 from third conveyor 18 onto alignment chute 26. Alignment chute 26 has a trough 25 associated with it for the alignment of bottle 11, as is shown. The bottle 11 may have another bottle 11 stacked upon it as is illustrated in the mid portion of alignment chute 26. As the two bottles slide down alignment chute 26 under the influence of gravity, the topmost bottle 11 strikes a plow 29. Plow 29 causes topmost bottle 11 to be deflected into the arrow chute 27. A fourth baffle 31 is placed on top of plow 29 to further ensure that bottles 11 are deflected into arrow chute 27 unless they have been captured by trough 25.

Bottles 11 which slide down trough 25 may do so base leading or neck leading as shown. In either case, bottle 11 enters a stand up chute 28 which is located in the area of a stand-up belt unit 24 which will be more fully described later. Upon entering the stand-up belt unit 24, bottle 11 is manipulated by the belting and exits base down on a fourth conveyor 20. Bottle 11 which may be unstable and may fall off of fourth conveyor 20 and be returned to second conveyor 16 for recycling. Fourth conveyor 20 carries the stable bottles 11 around to a fifth conveyor 22 for further processing.

FIG. 1A and FIG. 2A show a first alternate stand up belt unit 24A arranged in the same manner as stand up belt unit 24 and having in addition a post pair 32 to which is attached a retard finger pair 34. The function of retard finger pair 34 will be described in greater detail later in the body of this specification.

The stand-up belt unit 24 is shown in greater detail in FIG. 3 and FIG. 4. FIGS. 3 and 4 will be described together, since FIG. 3 is a side plan view of the stand up belt unit 24, and FIG. 4 is a top plan view of the stand up belt unit 24 showing the same parts.

A belt unit side plate 35 and 35A form the sides of stand up belt unit 24. The plates 35 and 35A are fastened together by a pair of belt unit spacers 37. Each of the side plates 35 and 35A has an elongated slot 33 so as to permit the adjustment of stand up belt unit 24 with respect to a first drive sprocket 30. Mounted on first drive sprocket 30 is fourth coveyor 20 which is positioned between side plates 35 and 35A. A first shaft 39 is permitted to protrude through side plates 35 and 35A by slots 33. Mounted on first shaft 39 is a second drive sprocket 44 for transmitting power to stand up belt unit 24. The second drive sprocket 44 provides power to and drives a sprocket chain 48 which also engages a first idler sprocket 40, a second idler sprocket 46 and a first drive sprocket 42. First idler sprocket 40 and second idler sprocket 46 are mounted on a first support shaft 102 and a second support shaft 104, respectively. The arrangement of drive chain 48, as shown, permits the horizontal adjustment of stand up belt unit 24 without loss of drive chain 48 tension. It is easily seen that stand up belt unit 24 can also be rotated about first shaft 39 as required without loss of drive chain 48 tension.

First driven sprocket 42 is mounted on a first drive shaft 43 which drives a gear box 50 and 50A. Each gear box 50 and 50A is affixed to its respective side plate 35 and 35A. Each respective gear box 50 and 50A drives a fourth shaft 70 and 70A. Fourth shaft 70 and 70A are respectively supported concentrically by first post 58 and 58A so that fourth shaft 70 and 70A is free to rotate. First post 58 and 58A are respectively affixed to a first support block 52 and 52A which are in turn fixed to respective side plates 35 and 35A. Similarly, a second support block 54 and 54A and a third support block 56 and 56A are affixed to respective side plates 35 and 35A, as shown.

At the end of each first post 58 and 58A and remote from first support blocks 52 and 52A is a third arm 82 and 82A for support of a fifth shaft 72 and 72A. Third arm 82 and 82A are adjustable so that the distance between shafts 70 and 72, and 70A and 72A can be adjusted. Fixed to first shaft 72 and 72A is a second small pulley 94 and 94A. Shaft 72 and 72A also has affixed a first intermediate pulley 98 and 98A and a fourth large pulley 100 and 100A, as shown.

A first small pulley 92 and 92A is affixed to fourth shaft 70 and 70A and is connected by an exit drive belt 74 and 74A to the second small pulleys 94 and 94A, thereby enabling the fifth shafts 72 and 72A to rotate. Pulleys 98 and 98A are connected by means of entrance drive belts 76 and 76A to a third small pulley 96 and 96A for the driving of a third shaft 68 and 68A. The third shafts 68 and 68A are rotationally supported by a second arm 80 and 80A. Second arm 80 and 80A are adjustable by means not shown. Also mounted on third shaft 68 and 68A are a collar 86 and 86A, a third large pulley 90 and 90A and a second large pulley 88 and 88A. Second large pulley 88 and 88A is free to move rotationally independent of the movement of third shaft 68 and 68A. An exit belt 38 and 38A is supported between pulleys 88 and 88A, and 100 and 100A, as shown.

Second arm 80 and 80A are supported in a fixed but adjustable position by a second post 60 and 60A, which posts are supported by second support blocks 54 and 54A. Third large pulleys 90 and 90A are connected to a first large pulley 84 and 84A by an entrance belt 36 and 36A, thereby making entrance belt 36 and 36A operative. First large pulley 84 and 84A are fixed to a second shaft 66 and 66A for support of the large pulley 84 and 84A. Second shaft 66 and 66A are rotationally supported by a first arm 78 and 78A. First arm 78 and 78A are in turn supported by a third post 62 and 62A affixed to third support block 56 and 56A. Collars 86 and 86A are used to limit the axial movement of second shafts 66 and 66A.

FIG. 5 shows details of the alignment chute portion 26. Those items which have been previously described will not be again described, what is shown new in FIG. 5 is a first slide surface 106 and an outer wall 108.

Figures 5A, 5B:
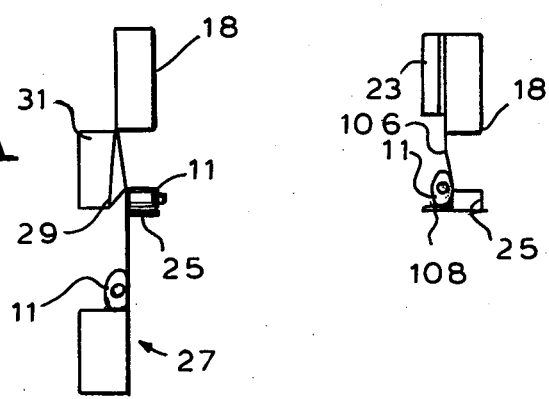
FIG. 5A, shows a cross section of FIG. 5 viewed in the direction of arrows 5A–5A'.
FIG. 5B, shows a cross section of FIG. 5 viewed in the direction of arrows 5B–5B'.

FIG. 5A shows a cross section taken through 5A-5A' of FIG. 5 and viewed in the direction of the arrows 5A-5A'. Here is seen the downward slope of first slide surfaces 106 from the level of third conveyor 18 to the trough 25. Also shown is the bottle 11 which has been captured by the trough 25 as well as the bottle 11 in return chute 27.

FIG. 5B shows a cross-section 5B-5B' of FIG. 5 under the aforementioned conditions. Here is seen the bottle 11 resting against outer wall 108. The bottle 11 has slid down slide surface 106. As bottle 11 moves down the slope of the alignment chute it will be captured by trough 25 or be deflected by plow 29.

Figure 6:
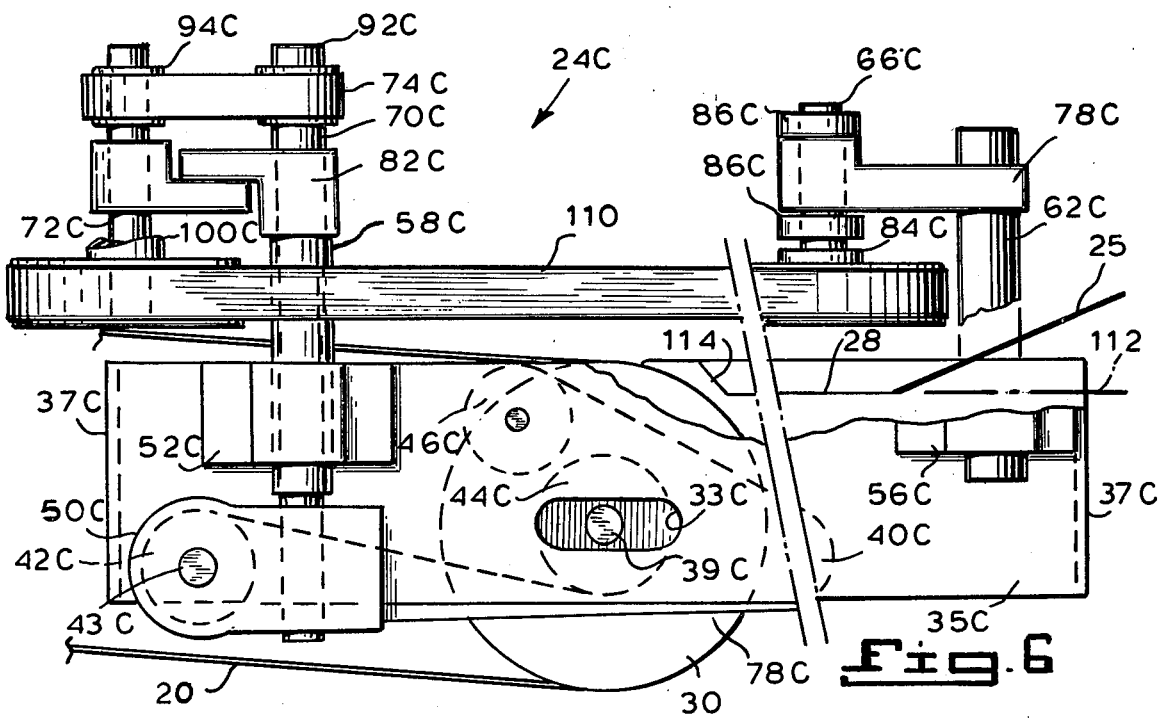
FIG. 6, shows a side view of a second alternate arrangement for the stand-up mechanism partially cut away to show the stand-up chute.

FIG. 6 shows a side view of a second alternate stand-up unit 24C partially cut away. Stand-up unit 24C is similar in design to stand-up unit 24 and components common to both units have already been described with reference to FIGS. 3 and 4, and are denoted by suffic C. Those items which are new are a stand-up belt pair 110 seen to run the length of unit 24C. The cut away portion of unit 24C makes more clear the stand-up chute 28, the trough 25 and an alternate position 112 for trough 28. Alongside sprocket 30 is seen a step transition 114 for preferred use with this unit 24C. Other transitions are possible although not shown.

The bottle conveying apparatus 10 will be more clearly understood from the following description of its operation when considered together with the various drawings.

The individual drive means for the various parts of apparatus 10 are not shown. Synchronization means for the various moving portions are also not shown since they will confuse the workings of apparatus 10. Further, these drive means and synchronization means are well known in the art.

Hopper 12 is loaded with bottles 11 and apparatus 10 is energized. First conveyor 14 lifts bottles 11 up its incline. The sloping construction of the bottom of hopper 12 causes bottle 11 to slide toward first conveyor 14. An arrow at the bottom most portion of first conveyor 14 shows the typical direction of bottle 11 flow. As first conveyor 14 lifts bottles 11 they are dropped off of first conveyor 14 when the bottles 11 reach the end of conveyor 14, as shown by the arrow.

Bottles 11, which drop off the end of conveyor 14, fall onto side chute 27 from where they slide onto second coveyor 16. First baffle 19 causes bottle 11 to move onto the horizontal portion of second conveyor 16. Second conveyor 16 carries bottles 11 (see arrow) over to second baffle 21 which diverts bottles 11 onto upwardly moving third conveyor 18. The arrows on third conveyor 18 show the conveyor's direction of motion as it lifts bottles 11 to where they contact third baffle 23.

Third baffle 23 directs bottles 11 in a well known manner so that the bottles 11 move in the direction shown by the arrow onto first slide surface 106. As bottles 11 slide down surface 106 they may be captured by trough 25. Bottles 11 not captured by trough 25 impinge on fourth baffle 31 and are diverted to side chute 27 for another go around. As bottle 11 is captured by trough 25 it may have another (multiple) bottle riding on top of it. The two slide down alignment chute 26 and the bottom bottle 11 passes under plow 29 whereas the top bottle 11 hits plow 29 and is diverted into side chute 27.

The bottles 11 which are captured in trough 25 are aligned either with base leading or neck leading as shown. As each bottle 11 enters the stand up belt unit 24 it is gripped on either side by entrance belts 36. The side gripping entrance belts 36, together with side gripping exit belts 38 and stand up chute 28, cause each bottle 11 to stand on fourth conveyor 20 in a base down configuration. The applicant has found that a preferred condition is obtained by running the entrance belts 36 twice as fast as the exit belts 38. Whereby the bottle 11 will leave the exit belts 38 base down on fourth conveyor 20. In general, the applicant has discovered that stand up belt unit 24 works best when entrance belt 36 is parallel to a straight portion of stand up chute 28, as shown. The aforesaid are preferred conditions although other conditions are operable.

Further, exit belt 38 is shown to be at an angle with respect to the surface of fourth conveyor 20, this arrangement imparts a downward component of force to the bottle 11 which ensures that it sits firmly on fourth conveyor 20. Fourth conveyor 20 and exit belt 38 are adjusted to run at the same speed. By adjusting stand up belt unit 24 horizontally about first shaft 39 and radially about shaft 39 the stand up performance of unit 24 can be varied. The drawings show that stand up chute 28 meets fourth conveyor 20 to provide a smooth transition. The stand up unit 24 will also function if there is an abrupt transition such as a step at the aforementioned point.

Reference to FIGS. 1A and 2A shows that a stand up belt unit 24A may alternately be used. Unit 24A has a retard finger pair 34 which is designed to engage a bottle 11 as it stands up. Retard finger pair 34 is generally made of tygon tubing but may be made of other suitable materials. In some cases the bottle 11 may tend to fall forward and retard finger pair 34 will prevent the rapid movement of bottle 11 but yield to the slower movement of bottle 11 due to the fourth conveyor 20.

FIG. 5 shows a portion of apparatus 10. This portion is that of alignment chute 26 and return chute 27. Alignment chute 26 employs a downwardly sloping first slide surface 106 to convey, by gravity means, the bottle 11 from the third conveyor 18 to the trough 25. Slide surfaces 106 is joined to trough 25 along one edge as is shown. This arrangement enables bottle 11 to be captured by trough 25 anywhere along the length of trough 25. The foregoing arrangement prevents a jam up of bottles 11 which might result if access to trough 25 was limited to the topmost portion of alignment chute 26. It is contemplated that alignment chute 26 can be used to align bottles 11 as shown regardless of the subsequent stand-up process.

FIGS. 5A and 5B show additional features of how the sloping slide surface 106 causes bottles to slide toward trough 25.

FIG. 6 illustrates the use of single pair of side gripping belts 110 which is used to stand-up the bottle 11 entering from trough 25. Belts 110 also extend into the fourth conveyor 20 area to perform the base down placement function. FIG. 6 further illustrates the use of the sloping transition 114 which is one of the preferred transitions for the stand-up chute 28. FIG. 6 also shows the alternate position 112 for the trough 25.

Further any means of feeding bottles 11 into stand-up unit 24, 24A and or 24c will result in bottles 11 being placed base down on fourth conveyor 20. Therefore, it is contemplated that other means than shown for aligning bottles 11 can be operatively employed with stand-up unit 24, 24A or 24C.

It is further contemplated that the outer wall 108 portion of trough 25 may be automatically opened to relieve a jammed condition in alignment chute 26 if this feature is desirable.

Thus, there has been shown and described a stand-up orientation apparatus wherein axially aligned bottles are fed, one at a time, while moving downwardly by gravity to be frictionally engaged by parallel overlapping belts in which the entrance belts move faster than the exit belts so as to cause a pushing upward on the trailing portion of the bottle and a gripping on the loading portion, so as to upright the bottle.

While there has been described what is at present considered to be the preferred embodiment of the invention, it will be obvious to those skilled in the art that various changes and modifications may be made therein without departing from the invention. It is, therefore, aimed in the appended claims to cover all such changes and modifications as fall within the true spirit and scope of the invention.

What is claimed is:

1. A bottle orientation apparatus, for the stand-up orientation of a plurality of bottles in a linear array, said bottle orientation apparatus comprising:
   (a) means for conveying a plurality of bottles in one direction;
   (b) means for aligning said conveyed bottles under the influence of gravity, so that the major axis of each of said bottles is parallel to the direction of movement, said alignment means including an alignment chute for conducting aligned bottles along said alignment means, first deflection means disposed upstream of and above said alignment chute, so that said bottles move downwardly and are deflected from said one direction into said alignment means, and along said alignment chute, second deflection means downstream of said first deflection means including a plow disposed above said alignment chute to engage a jamming bottle, said plow being fixedly mounted and angularly disposed, so as to engage a jam-up bottle and deflect same from said alignment chute; receiver means disposed below said plow for collecting said jam-up bottle when deflected by said plow, and transferring means for conveying said deflected bottle from said receiver means to said conveying means of (a);
   (c) means to impart differential forces to the leading and trailing portions of each of said bottles delivered in turn by said alignment chute so as to cause each of said bottles to be uprighted, said means to impart differential forces comprising a first entrance pair of side gripping belts disposed over a stand-up chute, and being provided with a transition for engaging said leading or trailing portions of said bottles, together with a first exit pair of side gripping belts parallel to and partially overlapping said first entrance pair of side gripping belts, said belts frictionally engaging opposed end portions of each of said bottles;
   (d) means to move said belts, said first entrance pair of side gripping belts operating and giving at a faster speed than said first exit pair of side gripping belts, so that differential speed frictional engagement is imparted to bottle portions adjacent each of said bottle ends, while said bottles are moving downwardly under the influence of gravity, carrying an uprighting action to each of said bottles due to said entrance belt pair moving faster than said exit belt pair, so as to cause a pushing upward on the trailing portions of each bottle and gripping the leading portion of said bottle, so as to upright said bottle;
   (e) an exit conveyor disposed downstream of said first pair of exit belts, and means to move said exit conveyor at about the same speed as the speed of said first pair of exit belts; and
   (f) said belts being angularly disposed, so that said bottles are influenced by gravity, and said exit conveyor being horizontally disposed, so as to support those bottles oriented in an upright position with base end down.

2. The apparatus of claim 1, wherein said means to move said belts moves the first pair of entrance belts at a speed about twice that of the first pair of exit belts.

3. The apparatus of claim 1, wherein said first pair of exit belts are disposed above said first pair of entrance belts.

4. The apparatus of claim 1, wherein the height of the belts at the overlap portion is about the height of the bottle side portion.

* * * * *